(12) United States Patent
Jubin

(10) Patent No.: US 6,406,145 B1
(45) Date of Patent: Jun. 18, 2002

(54) CONTACT LENSES WITH IMPROVED CENTERING AND ORIENTING

(75) Inventor: Philippe Jubin, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 09/747,510

(22) Filed: Dec. 20, 2000

(51) Int. Cl.⁷ .............................. G02C 7/02; G02C 7/04
(52) U.S. Cl. .................... 351/177; 351/160 R
(58) Field of Search .................. 351/177, 160 R, 351/160 H, 161–162, 176

(56) References Cited

U.S. PATENT DOCUMENTS

| | | | |
|---|---|---|---|
| 4,874,234 A | * 10/1989 | Wichterle | 351/161 |
| 5,452,031 A | 9/1995 | Ducharme | 351/177 |
| 5,502,518 A | 3/1996 | Lieberman | 351/160 R |
| 5,517,260 A | * 5/1996 | Glady et al. | 351/169 |
| 5,570,142 A | 10/1996 | Lieberman | 351/160 R |
| 5,953,098 A | 9/1999 | Lieberman et al. | 351/160 R |
| 6,099,121 A | 8/2000 | Chapman et al. | 351/160 H |
| 6,231,182 B1 | * 5/2001 | Guilino et al. | 351/159 |

* cited by examiner

Primary Examiner—Jordan M. Schwartz
(74) Attorney, Agent, or Firm—Lois Gianneschi

(57) ABSTRACT

The invention provides a rotationally stabilized contact lens that takes into account the natural shape of the lens wearer's cornea in the design of the base curve of the lens. The invention provides an effective method, and lenses incorporating that method, for on-eye lens stabilization that eliminates the need for increasing the lens' peripheral thickness to stabilize the lens, resulting in a more comfortable lens on-eye. Additionally, the invention provides a flexible base curve design method that results in improved lens fit and centration.

8 Claims, 1 Drawing Sheet

CONTACT LENSES WITH IMPROVED CENTERING AND ORIENTING

FIELD OF THE INVENTION

The invention relates to contact lenses. In particular, the invention provides contact lenses in which the wearer's corneal shape is taken into consideration in providing for stabilization and orientation of the lens on the eye.

BACKGROUND OF THE INVENTION

It is known that correction of certain optical defects can be accomplished by imparting non-spherical corrective characteristics to one or more surfaces of a contact lens, such as cylindrical, bifocal, or multifocal characteristics. The use of contact lenses with these characteristics is problematic in that the lens must be maintained at a specific orientation while on the eye to be effective. However, the lens will rotate on the eye due to blinking as well as eyelid and tear fluid movement.

Lenses designed to maintain their on-eye orientation typically are of two general types. One type uses prism stabilization to maintain the lens orientation. Examples of prism stabilization methods include decentering of the lens' front surface relative to the back surface, prismatic balancing, thickening of the lower lens edge, supporting the lens on the lower eyelid, forming depressions or elevations on the lens' surface, and truncating the lens edge.

A second type, dynamically stabilized lenses, uses the movement of the eyelids to maintain lens orientation. Dynamic stabilization methods include reducing the thickness of the lens' outer surface at two symmetrically lying regions, thickening two outer regions in the horizontal center axis, and thinning, or slabbing off, top and bottom zones on the lens.

The known methods for maintaining lens orientation suffer from a number of disadvantages including that the lenses incorporating the methods require specialized tooling for production, that the lenses are uncomfortable to wear, and that the known methods are not highly effective. Thus, a need exists for a method of maintaining angular orientation that overcomes some or all of these disadvantages.

DETAILED DESCRIPTION OF THE INVENTION AND PREFERRED EMBODIMENTS

It is a discovery of the invention that a rotationally stabilized contact lens may be obtained by taking into account the natural shape of the lens wearer's cornea in designing the base curve of the lens. The invention provides an effective method, and lenses incorporating that method, for on-eye lens stabilization that eliminates the need for increasing the lens' peripheral thickness to stabilize the lens, resulting in a more comfortable lens on-eye. Additionally, the invention provides a flexible base curve design method that results in improved lens fit and centration.

It is known that, typically, the inferior portion of an individual's cornea is steeper than the superior portion. The present invention uses this fact to aid orienting and centering of a contact lens on the wearer's eye by matching the steepest portion of the lens with the steepest portion of the cornea.

In one embodiment, the invention provides a method for producing contact lenses comprising, consisting essentially of, and consisting of: a.) selecting for a base curve of the lens a first curve for an optic zone and one or more second curves for a peripheral zone; b.) using the first and second curves selected in step a.) to generate a cross-section of the lens; c.) rotating the one or more second curves of the peripheral zone around an optic zone axis; and d.) determining a shape for each of the one or more second curves, wherein the shape varies as a function of an angle of rotation of the one or more second curves around the optic zone axis. In another embodiment, the invention provides a lens made according to the method of the invention.

For purposes of the invention by "peripheral zone" is meant the area outside of the optic zone. Typically, this area will include a non-optical lenticular zone, a bevel, or the like, and combinations thereof In the first step of the method of the invention, a curve is selected for the optic zone and one or more curves are selected for the peripheral zone of the base curve of the lens. The optic zone curve may be any curve suitable for providing the visual acuity correction desired. Illustrative optic zone shapes include, without limitation, spherical, aspherical, toric, multifocal, and the like, and combinations thereof The optic zone may be of any suitable diameter and preferably is at least about 6 mm in diameter.

Figure 1:
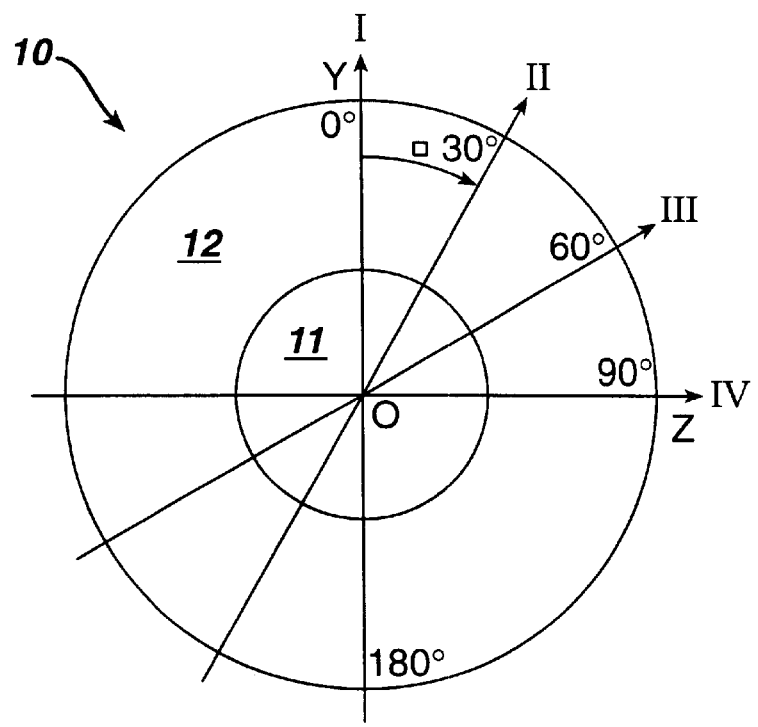
FIG. 1 illustrates a magnified, plan view of a surface of the lens of the invention.

The desired peripheral zone curve or curves are selected based on the fit desired for the lens on an individual's eye and the optic zone curve selected. The shape selected for the peripheral zone at the 0 degree angle relative to the lens' optical axis may be any desired including, without limitation, spherical, aspherical, splined, polynomial, or the like and combinations thereof Once the optic and peripheral zone curves are selected, a cross-section of the lens is generated using these curves. In FIG. 1 is shown a surface of a lens 10 of the invention having a spherical optic zone 11. Additionally, lens 10 includes peripheral zone 12 having one curve. A three-dimensional geometry for the peripheral zone 12 is obtained by rotating the cross-section around the optical zone axis using an angle dependent function. Thus, the shape of the peripheral zone will vary as a function of the angle of rotation as shown in the partial cross-sections of FIG. 2.

The angle dependent function selected to determine the shape of the peripheral zone curves of the lens must be smooth and continuous from 0 to 2 pi in order to avoid any discontinuity in the surface. Preferably, if the cross-section of the surface is aspheric, one of the radius, the diameter, the sagittal depth, or the shape function may be varied. Any suitable shape-dependent function may be used. Preferably, the function used is a trigonometric function that is at most modulo 2 pi.

An exemplary function is $R(\theta) = A \cos \theta + B$, wherein $R(\theta)$ is the radius of the peripheral zone curve at angle $\theta$ and A and B are constants determined using the expected radius at two different angles. For example, if only one, spherical curve is used for the peripheral zone and the radius of that curves is supposed to be $R_0$ at 0° and $R_{180}$ at 180°, then the function is:

$$R(\theta) = \frac{(R_0 - R_{180})}{2}\cos\theta + \frac{(R_0 + R_{180})}{2}$$

Figure 2:
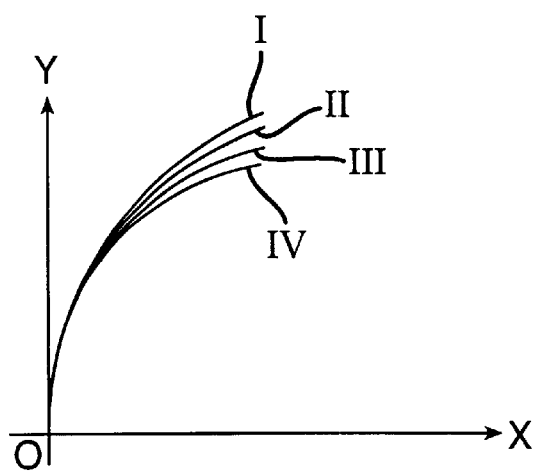
FIG. 2 illustrates a view of partial cross-sections of the surface of FIG. 1 taken at I, II, III, and IV.

The resulting lens is the lens of FIGS. 1 and 2 where the peripheral zone radius and diameter vary around the optic zone axis as follows: at 0°, the radius and diameter are R1_00 and D1_00; at 30° the radius and diameter are R1_30 and D1_30; at 60° the radius and diameter are R_60 and D1_60; and at 90° the radius and diameter are R1_90 and D1_90.

The lenses of the invention may be either hard or soft contact lenses. Preferably, the lenses are soft contact lenses. The lenses of the invention may have any of a variety of corrective optical characteristics incorporated onto the convex, or front, surface, the concave, or back surface, or both surfaces. For example, the lens may have any one or more of spheric, aspheric, bifocal, multifocal, prismatic, or cylindric corrections. The invention may find its greatest utility in lenses in which at least one of the corrective characteristics requires that the on-eye orientation of the lens with respect to the eye remains stable. In a preferred embodiment, the lens of the invention is a toric, soft contact lens meaning that the soft contact has a cylindrical optical surface, or power, to correct for the wearer's astigmatism.

The lens of the invention may be customized for a particular individual by using ocular optical wavefront aberration measurements. By "optical wavefront aberration" is meant the difference between the wavefront emerging from the eye compared to the wave front converging on the retina. These measurements may be carried out using, for example, the output of a crossed cylinder aberroscope, a device that measures ocular Modulation Transfer Function via point spread or line spread, or any similar device that measures, estimates, interpolates or calculates the ocular optical wavefront. Once measured, the aberration measurements are mathematically converted to a height difference, thus providing an elevation map above and below a designated mean sphere value, known as the optical path difference. For example, the elevation map may be created by multiplying the wavefront error, as measured in optical waves, by the wave length, point-by-point, across the wavefront. Correction for the aberrations will be provided by introduction of an optical path difference, or aberration inverse filter, that offsets the distortions due to the ocular aberrations. The correction may be on either or both the front and back lens surfaces.

In the customized lens embodiment, conventional spherecylindrical prescriptive information also may be used in designing and forming the lens. This information includes the distance sphere, distance astigmatic cylinder power and axis, and the near vision power, if required. This information may be determined using conventional subjective refraction techniques. Alternatively, the sphere, cylinder and axis may be determined based on an analysis of the wavefront accomplished, for example, by reducing the Hartmann Shack wavefront data to Zernike coefficient terms, and using the relevant terms to derive the sphere, cylinder and axis information.

Although the lenses of the invention may be hard or soft lenses, preferably the material selected for forming the lenses of the invention is a material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

What is claimed is:

1. A method for producing contact lenses, comprising the steps of: a.) selecting for a base curve of the lens a first curve for an optic zone and one or more second curves for a peripheral zone; b.) using the first and second curves selected in step a.) to generate a cross-section of the lens; c.) rotating the one or more second curves of the peripheral zone around an optic zone axis; and d.) determining a shape for each of the one or more second curves, wherein the shape varies as a function of an angle of rotation of the one or more curves around the optic zone axis.

2. The method of claim 1, wherein the one or more second curves are selected from the group consisting of spherical, aspherical, splined, polynomial, and combinations thereof.

3. The method of claim 1, wherein the function used in step d.) is a trigonometric function of at most modulo 2 pi.

4. The method of claim 1, further comprising calculating the optical ocular wavefront aberrations of an individual.

5. A contact lens made according to method of claim 1.

6. The contact lens of claim 5, wherein the lens is a soft contact lens.

7. The lens of claim 5, wherein the lens is a toric lens.

8. The lens of claim 6, wherein the lens is a toric lens.

* * * * *